(12) United States Patent
Mihlbauer et al.

(10) Patent No.: US 9,363,978 B2
(45) Date of Patent: Jun. 14, 2016

(54) ANIMAL HABITAT

(71) Applicant: CENTRAL GARDEN & PET COMPANY, Walnut Creek, CA (US)

(72) Inventors: Brad L. Mihlbauer, Mukwonago, WI (US); Matthew D. Allen, Waterford, WI (US); Phillip C. Bartoszek, New Berlin, WI (US); Thomas Robert Lutz, Cedar Rapids, IA (US)

(73) Assignee: CENTRAL GARDEN & PET COMPANY, Walnut Creek, CA (US)

( * ) Notice: Subject to any disclaimer, the term of this patent is extended or adjusted under 35 U.S.C. 154(b) by 779 days.

(21) Appl. No.: 13/770,967

(22) Filed: Feb. 19, 2013

(65) Prior Publication Data

US 2014/0230740 A1   Aug. 21, 2014

(51) Int. Cl.
  *A01K 63/00*   (2006.01)
  *A01K 1/03*    (2006.01)

(52) U.S. Cl.
  CPC ............. *A01K 1/03* (2013.01); *A01K 63/003* (2013.01)

(58) Field of Classification Search
  CPC ....... A01K 1/031; A01K 63/003; A01K 1/03; A01K 1/032; A01K 1/034; A01K 1/035; A01K 63/00; A01K 63/006
  USPC ............. 119/246, 251, 418, 452, 472, 499, 1
  See application file for complete search history.

(56) References Cited

U.S. PATENT DOCUMENTS

| | | | | |
|---|---|---|---|---|
| 3,804,064 A * | 4/1974 | Kuneman | ............. | A01K 63/006 119/246 |
| 5,134,969 A * | 8/1992 | Mason | .................... | A01K 1/031 119/472 |
| 5,404,839 A | 4/1995 | Mancuso | | |
| 5,431,129 A * | 7/1995 | Clark | .................... | A01K 31/06 119/459 |
| 5,713,304 A * | 2/1998 | de Vosjoli | ............ | A01K 63/003 119/246 |
| 5,842,439 A | 12/1998 | Selstad | | |
| 5,862,778 A * | 1/1999 | Matsumoto | .............. | A01K 1/03 119/452 |
| 5,950,563 A | 9/1999 | Adcock, Jr. | | |
| 5,950,566 A * | 9/1999 | Ricketts | ................. | A01K 1/031 119/473 |
| 6,352,076 B1 * | 3/2002 | French | ..................... | A61D 7/04 119/420 |
| 6,971,208 B2 * | 12/2005 | Krueger | .................... | B60P 3/03 296/24.42 |
| 7,481,183 B2 * | 1/2009 | Van Heygen | ........ | A01K 63/003 119/246 |
| 7,487,744 B1 * | 2/2009 | Goldberg | ............... | A01K 1/031 119/453 |
| 8,141,517 B2 * | 3/2012 | Shimoda | ................ | A01K 1/034 119/473 |
| D705,495 S * | 5/2014 | Snow | .......................... | D30/108 |
| D705,498 S * | 5/2014 | Snow | .......................... | D30/114 |
| 8,973,533 B2 * | 3/2015 | Hampel | ....................... | 119/502 |
| 2002/0152969 A1 * | 10/2002 | Grigsby | ................. | A01K 1/033 119/500 |

* cited by examiner

*Primary Examiner* — Yvonne Abbott-Lewis
(74) *Attorney, Agent, or Firm* — Grossman, Tucker, Perreault & Pfelger, PLLC

(57) ABSTRACT

An animal habitat arrangeable in a vertical or a horizontal orientation comprising a rectangular enclosure having four side-walls and two opposing end-walls, wherein the four side-walls are joined to a frame at a first end of the enclosure; and the two opposing end-walls comprise a first end-wall and a second-end wall; wherein the first end-wall is releasably connectable to the frame, positionable within the frame in a plurality of orientations and provides an end-wall door with access to an interior of the rectangular enclosure; wherein at least one of the side-walls provides a side-wall door with access to the interior of the rectangular enclosure and has a hinge position which is changeable along opposite side-walls of the enclosure.

21 Claims, 15 Drawing Sheets

ANIMAL HABITAT

FIELD OF THE INVENTION

This disclosure relates to animal habitats, and more particularly pet habitats, such as pet terrariums, for small animals including reptiles, amphibians and rodents.

BACKGROUND

Animal habitats may be used to house small animals such as reptiles, amphibians and rodents. Small reptiles may include snakes (e.g. ball python, king snake) and lizards (e.g. geckos such as leopard geckos and fat tailed geckos, agama, chameleon, iguana, pogona), which may include desert and tropical species. Small amphibians may include salamanders and frogs. Small rodents may include hamsters, gerbils, guinea pigs, mice and rats.

Generally animal habitats are in the form of an enclosure which is not particularly versatile. Habitats, particularly for reptiles and amphibians, may be generally little more than a glass (aquarium) tank with a ventilated lid. Access to the interior of the glass tank may be understood to be limited to a single side of the tank, i.e. the lid, and require removal of the lid and any accessories located thereon. Also, cords and tubing must often be passed between the tank and the lid, which creates a potential opening in the enclosure through which the animal within habitat may attempt to escape. Additionally, the walls of the tank may be understood to be permanently fixed, and may not be adapted to form a different structure. Furthermore, such tanks are understood as not being suitable for use in more than one orientation. What is needed is a pet habitat that overcomes the limitations of the art.

SUMMARY

The animal habitats of the present disclosure provide a combination of unique features which allows the animal habitats to be used in either a vertical or horizontal orientation while maintaining the various functions thereof. The animal habitats disclosed herein also permit end users to configure the habitats in a multitude of different configurations to better fit the life requirements of the animal being housed.

In addition to the animal habitats of the present disclosure being positionable in either a vertical or horizontal orientation, the animal habitats disclosed herein may provide a side-wall door to provide an access opening to an interior of the habitat. The side-wall door may be easily removable and installable, and may be installed to hinge along either longitudinal side of the door (e.g. either a left-hand swing or a right-hand swing). The side-wall door may also be provided in the form of a screen (vented) door or a glass door, to increase humidity within then habitat.

The animal habitats disclosed herein may also provide an end-wall which includes an end-wall door with a hinge to provide an access opening to an interior of the habitat.

Additionally, the end-wall may also include an automatic (self-closing) power cord/air tubing routing mechanism. The cord and/or tubing routing mechanism may comprise an aperture which is closeable with a spring loaded closure mechanism which closes around the cord/tubing automatically after it has been routed through the aperture in the end-wall. The routing mechanism may accommodate multiple sizes of cord/tubing and the closure mechanism may automatically self-adjust for the size of the item being routed.

Furthermore, the end-wall may include fastening mechanism to the remainder of the habitat which provides quick and easy removal of the end-wall from the habitat.

The animal habitats disclosed herein may also provide an end-wall which, in addition to being quickly and easily removable, may be installed in a plurality (e.g. four) of orientations/positions, depending on the habitat orientation or a preference of the end user, while maintaining the foregoing hinging, fastening and cord/tubing routing functions in any position. Also in various embodiments, the end-wall may also be provided in the form of a screen door, or a solid glass panel to increase humidity within the habitat.

The animal habitats disclosed herein may also provide an end-wall with a mounting structure which provides for quick and easy attachment or removal of one or more accessories, such as a lamp (heat lamp and/or UVB (day) lamp), to or from the end-wall. Such may be accomplished, for example, with snap-in features. Furthermore, the mounting structure may be useable in either a vertical or horizontal orientation of the habitat.

The animal habitats disclosed herein may also provide a bedding guard in the form of a removable closure panel located adjacent and inside of the end-wall, such that, when the habitat is in a horizontal orientation, a portion of habitat provides a bedding containment area.

The animal habitats disclosed herein, when the enclosure is in the vertical orientation, may also provide a water-tight basin formed by a portion of the habitat.

In one exemplary embodiment an animal habitat is provided comprising a rectangular enclosure arrangeable in a vertical or a horizontal orientation, the rectangular enclosure comprising four side-walls and two opposing end-walls, wherein the two opposing end-walls comprise a first end-wall and a second-end wall. The four side-walls are joined to a frame at a first end of the enclosure, and the first end-wall is releasably connectable to the frame and positionable within the frame in a plurality of orientations. The first end-wall comprises a divided end-wall having a divided end-wall first portion and a divided end-wall second portion. The divided end-wall first portion is movable about an end-wall hinge to provide an end-wall door and access to an interior of the rectangular enclosure. At least one of the side-walls comprises a divided side-wall having side-wall first portion and a divided side-wall second portion. The divided side-wall first portion is movable about a side-wall hinge to provide a side-wall door and access to the interior of the rectangular enclosure, wherein the side-wall hinge has a hinge position which is changeable such that, when in a first hinge position, the divided side-wall first portion is rotatable along a first longitudinal side of the enclosure and, when in a second hinge position, the divided side-wall first portion is rotatable along a second longitudinal side of the enclosure.

FIGURES

The above-mentioned and other features of this disclosure, and the manner of attaining them, will become more apparent and better understood by reference to the following description of embodiments described herein taken in conjunction with the accompanying drawings, wherein:

FIG. 10 also shows an embodiment of an animal habitat according to the present disclosure with the end-wall formed of glass rather than the screen shown in FIG. 1;

DETAILED DESCRIPTION

Figure 1:
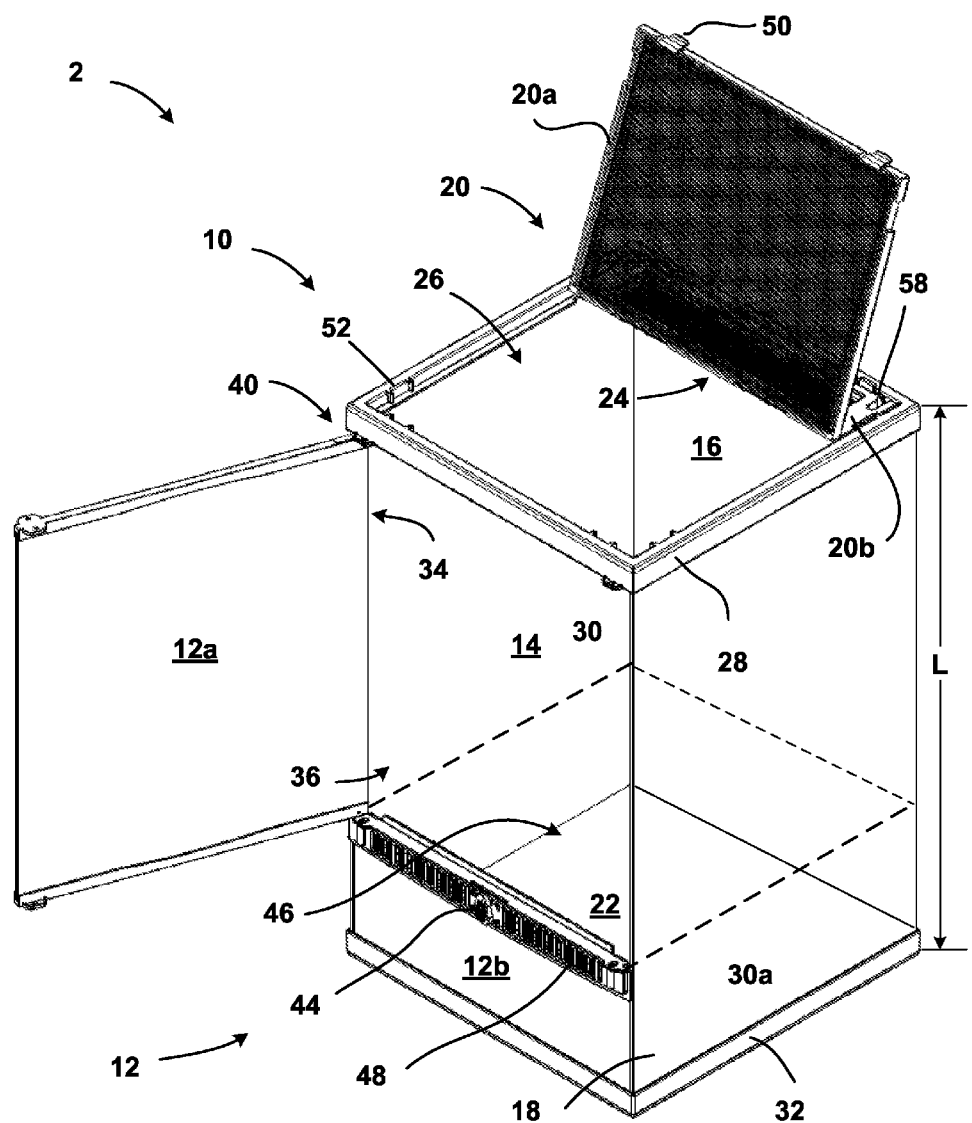
FIG. 1 is an isometric view of a first embodiment of an animal habitat according to the present disclosure arranged in a vertical orientation.

It may be appreciated that the present disclosure is not limited in its application to the details of construction and the arrangement of components set forth in the following description or illustrated in the drawings. The invention(s) herein may be capable of other embodiments and of being practiced or being carried out in various ways. Also, it may be appreciated that the phraseology and terminology used herein is for the purpose of description and should not be regarded as limiting as such may be understood by one of skill in the art.

Referring now to the figures, FIG. 1 provides an isometric view of a first embodiment of an animal habitat 2 according to the present disclosure. Animal habitat 2 may be particularly suited to house small animals such as reptiles, amphibians and rodents. Small reptiles may include snakes (e.g. ball pythons and king snakes) and lizards (e.g. geckos such as leopard geckos and fat tailed geckos, agamas, chameleons, iguanas, and pogonas), which may include desert and tropical species. Small amphibians may include salamanders and frogs. Small rodents may include hamsters, gerbils, guinea pigs, mice and rats.

As shown in FIG. 1, animal habitat 2 may comprise a rectangular enclosure 10. While shown in a vertical orientation, animal habitat 2 may be arrangeable in either a vertical or horizontal orientation. In such a manner, the habitat 2 may provide a different animal habitats in each orientation. For example, in a vertical orientation, the habitat 2 may provide amphibious environment while in a horizontal orientation the habitat 2 may provide a dry environment. As used herein, animal habitat 2 may be understood to be in a vertical orientation when a longitudinal length L of the enclosure 10, as denoted by a longest side of the habitat 2, is arranged vertically. Conversely, as used herein, animal habitat 2 may be understood to be in a horizontal orientation when a longitudinal length of the habitat, as denoted by the longest side L of the enclosure 10, is arranged horizontally.

As shown, enclosure 10 comprises four sides in the form of planar side-walls 12, 14, 16 and 18, as well as two opposing ends in the form of planar end-walls, which may be referred to as first end-wall 20 and second end-wall 22. The four side-walls 12, 14, 16 and 18 may be joined to a first four-sided frame 28 at a first end of the enclosure 10, and a second four-sided frame 32 at a second opposite end of the enclosure 10.

As discussed in greater detail below, the first end-wall 20 is releaseably connectable to the frame 28 and positionable within the frame 28 in a plurality of different orientations. More particularly, first end-wall 20 may be releasably connectable to frame 28 in four different orientations by rotating the end-wall 20, once released from the enclosure 10, from one orientation to another orientation.

First-end wall 20 may particularly comprise a divided end-wall, which may more particularly comprise a divided end-wall first portion 20a and a divided end-wall second portion 20b. As shown, the divided end-wall first portion 20a is movable (rotatable) about an end-wall hinge 24 to provide an end-wall door which opens to provide an end-wall access opening 26 to an interior 30 of the rectangular enclosure 10, as well as close the access opening 26. As better shown in FIG. 2, end-wall hinge 24 comprises a modified piano hinge.

Side-wall 12 may particularly comprise a divided side-wall, which may more particularly comprise a divided side-wall first portion 12a and a divided side-wall second portion 12b. As shown, the divided side-wall first portion 12a is movable (rotatable) about a side-wall hinge 34 to provide a side-wall door which opens to provide a side-wall access opening 36 to the interior 30 of the rectangular enclosure 10, as well as close the access opening 36. Side-wall hinge 34 may be provided by inserting a first hinge pin (e.g. cotter pin) through adjacent circular coaxial apertures in each of the divided side-wall first portion 12a and the frame 28 at one hinge end of the divided side-wall first portion 12a, as well as a second hinge pin through adjacent circular coaxial apertures in each of the divided side-wall first portion 12a and a trim member 48 and the other hinge end of the divided side-wall first portion 12a.

The side-wall hinge 34 may have a hinge position 40 in the present embodiment of the animal habitat 2, as well as another hinge position 42 (shown in FIG. 10) in another embodiment of the animal habitat 2. Thus, the side-wall hinge 34 has a hinge position which is changeable such that, when in a first hinge position 40, the divided side-wall first portion 12a is rotatable along a first longitudinal side-wall 14 of the enclosure 10 and, when in a second hinge position 42, the divided side-wall first portion 12a is rotatable along a second longitudinal side-wall 18 of the enclosure 10.

Regardless of hinge position 40 or 42, side-wall first portion 12a may be held and maintained in a closed position by a centrally located (between the opposing hinge locations) rotatable locking mechanism 44 which, by cam action, raises and lowers a locking bar in a known manner.

Side-walls 12b, 14, 16, 18 and end-wall 22 may particularly be formed of glass plate, and joined to frame 32 in such a manner, that when the enclosure 10 is in the vertical orientation, a (lower) portion 30a of the interior 30 of rectangular enclosure 10 (beneath the dotted line surrounding the enclosure 10) provides a water-tight basin 46 (i.e. does not leak water) at the second end of the enclosure 10 (e.g. the lower inches of the enclosure). As shown, the water-tight basin 46 is formed by the second end-wall 22, the divided side-wall second portion 12b and a portion of the three remaining side-walls 14, 16 and 18.

Figure 4:
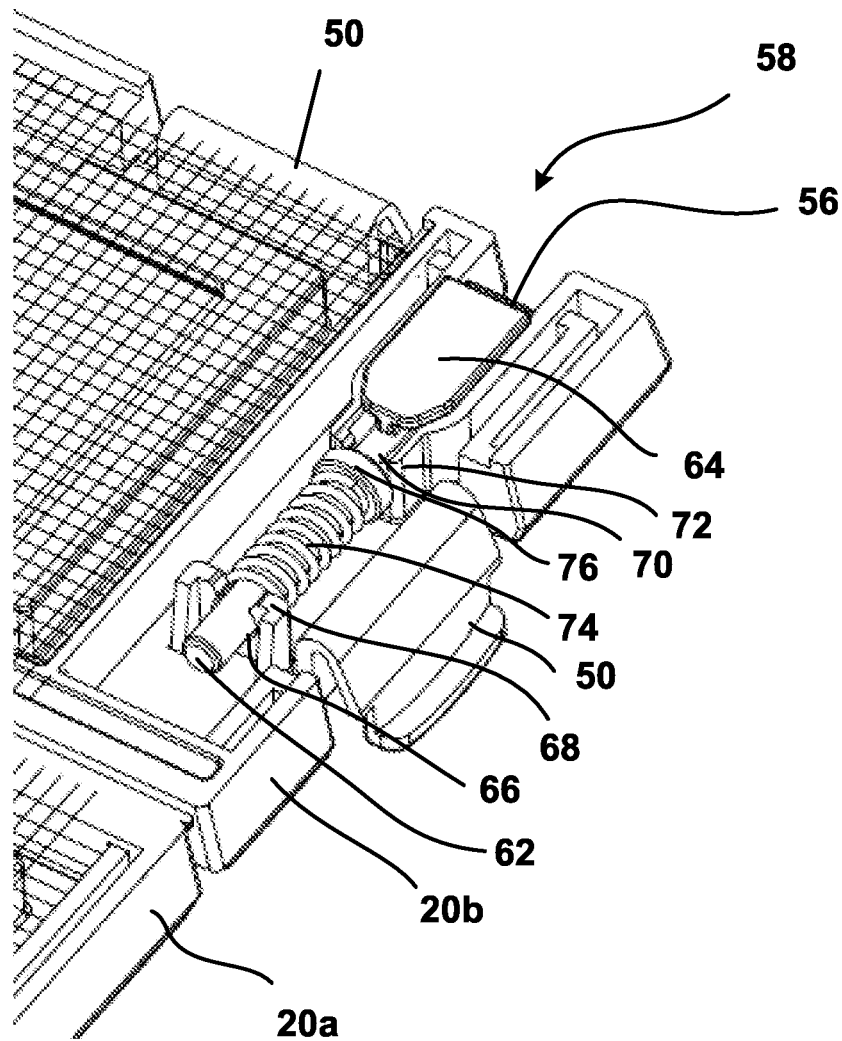
FIG. 4 is a bottom view of a portion of the end-wall of the animal habitat of FIG. 1.

As set forth above, the first end-wall 20 is releaseably connectable to the frame 28 and positionable within the frame 28 in a plurality of orientations. More particularly, first end-wall 20 is releaseably connectable to the frame 28 by a plurality of elastically deformable, cantilevered U-shaped engagement tabs 50 (as best shown in FIG. 4) which are configured to fit and lock beneath an engagement lip 54 (best shown in FIG. 12) in engagement receptacles 52 of frame 28. When all the engagement tabs 50 are disengaged from the engagement receptacles 52, by deforming the U-shaped engagement tabs 50 in a manner which narrows the U-shaped portion, end-wall 20 may be removed from frame 28 by lifting the end-wall 20 away from the frame 28 in a direction normal to the upper surface of the end wall 20. So that first end-wall 20 may be connected to frame 28 in one of four different orientations, the engagement tabs 50 and engagement receptacles 52 are positioned on each side of end-wall 20 and frame 28, respectively, such that any side of the end-wall 20 will mate with any side of the frame 28. As such, the divided first end-wall 20a is positionable and connectable to the frame 28 such that the end-wall door is openable and closeable along any of the four side-walls 12, 14, 16 or 18.

Figure 2:
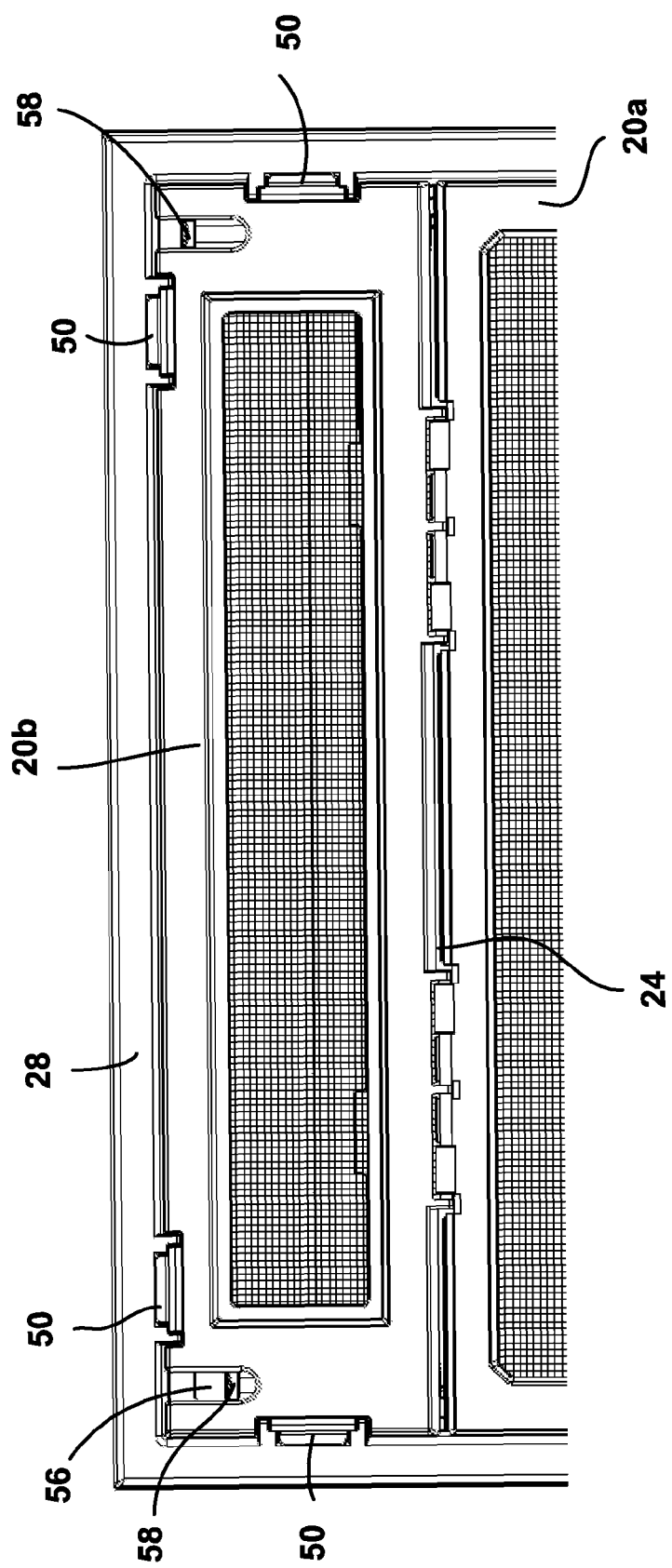
FIG. 2 is a top view of a portion of an end-wall of the animal habitat of FIG. 1.
Figure 3:
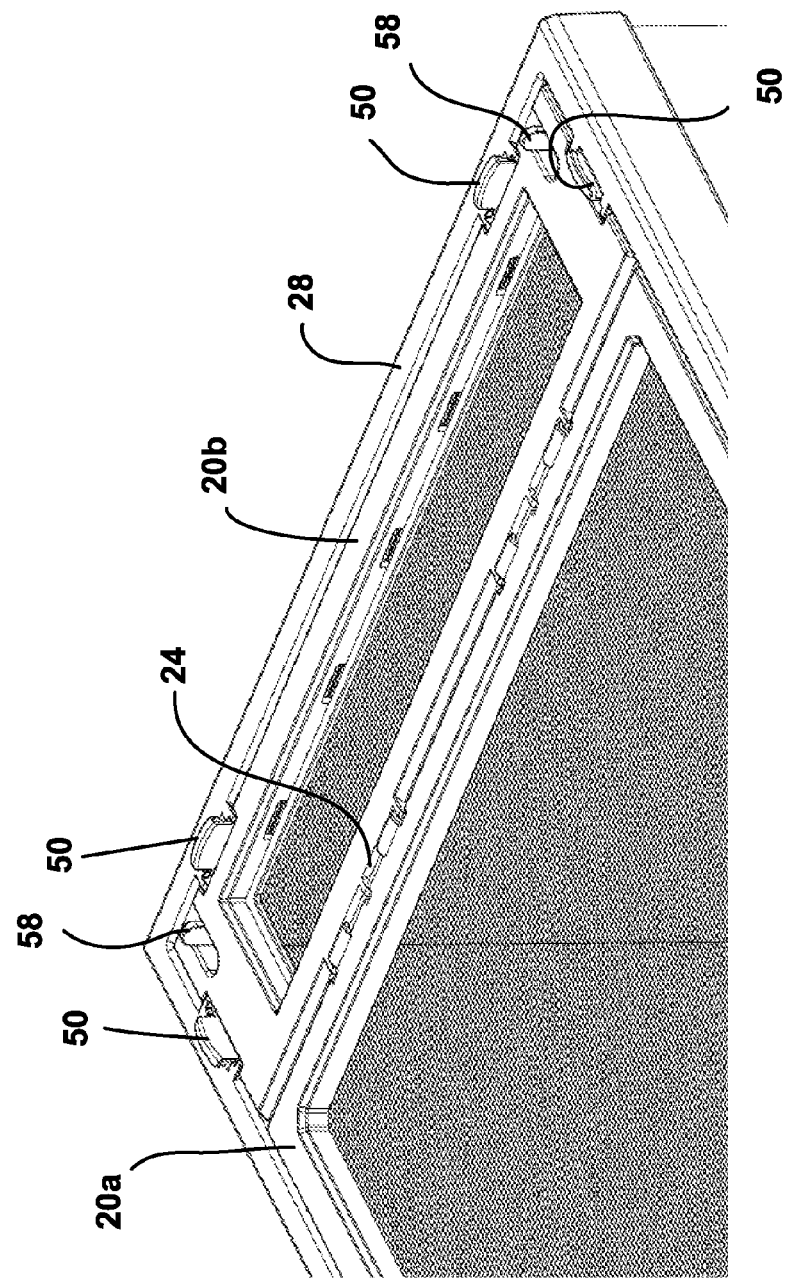
FIG. 3 is an isometric view of a portion of the end-wall of the animal habitat of FIG. 1.

As best shown in FIGS. 2 and 3, first end-wall 20, and in particular end-wall second portion 20b, may include one or more U-shaped apertures 56 which are closable by a self-closing (spring loaded) closure mechanism 58. As shown in FIG. 2, the aperture 56 to the left is shown open, and the aperture 56 to the right is shown closed.

As shown in FIG. 4, self-closing closure mechanism 58 may comprise a pin member 62 which is connected to a movable sliding door member 64. Pin member 62 is arranged to snap into and travel within C-shaped apertures 66 and 70 provided by two spaced apart support members 68, 72 adjacent opposite ends thereof. As shown, a coil (compression) spring 74 is arranged over the pin member 62, and is located (held) between support member 68 and stop ring 76, which limits the extended travel of the closure mechanism 58 upon coming into contact with support member 72.

Spring 74 provides a bias force against the movable sliding door member 64 being moved towards a retracted position. In its extended position, the door member 64 is extended to close aperture 56 by a decompression force a coil spring 66 arranged to provide a bias (compression) force opposing the door member 64 from being retracted to open aperture 56. The bias force is generated by the spring 66 being compressed between support members 68 and 72.

Self-closing closure mechanism 58 may be particularly adapted to automatically close against one or more objects located in aperture 56. For example, self-closing closure mechanism 58 may be adapted to close against one or more tubular members located in aperture 56, such as one or more electrical wires (of an electrical cord) or hollow plastic airway tubing. In this manner, the aperture 56 always remains substantially closed, particularly to inhibit animals contained within the interior 30 of enclosure 10 from escaping therefrom through aperture 56. Importantly, apertures 56, due to the U-shape thereof, allow the first end wall 20 to be removed from the enclosure 12 and release the cord and/or tubing therefrom without necessarily disturbing the cord and/or tubing.

Figure 5:
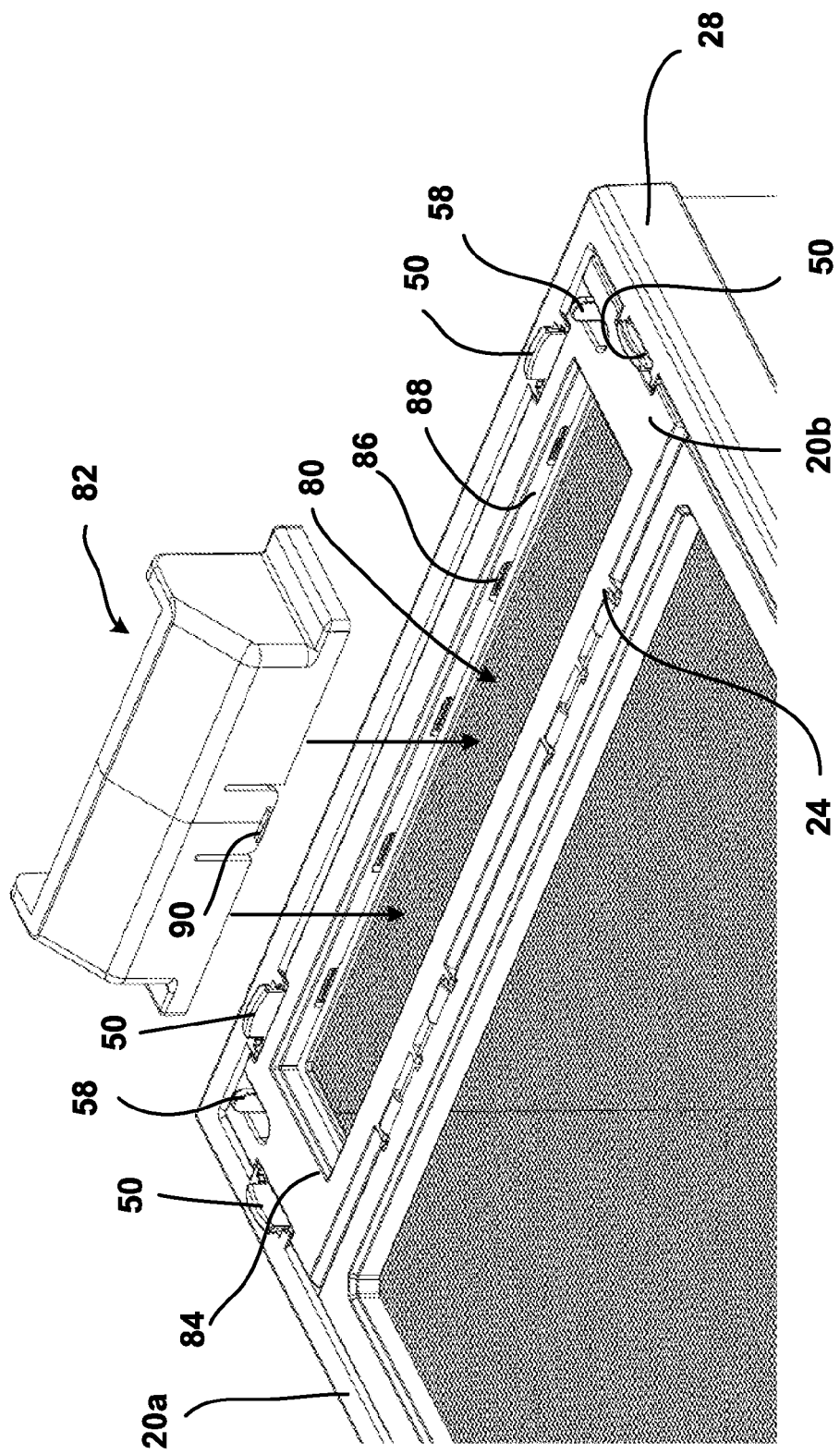
FIG. 5 is a front side isometric view of a portion of the end-wall of the animal habitat of FIG. 1 including a mounting structure of an accessory to be mounted to the end-wall.
Figure 6:
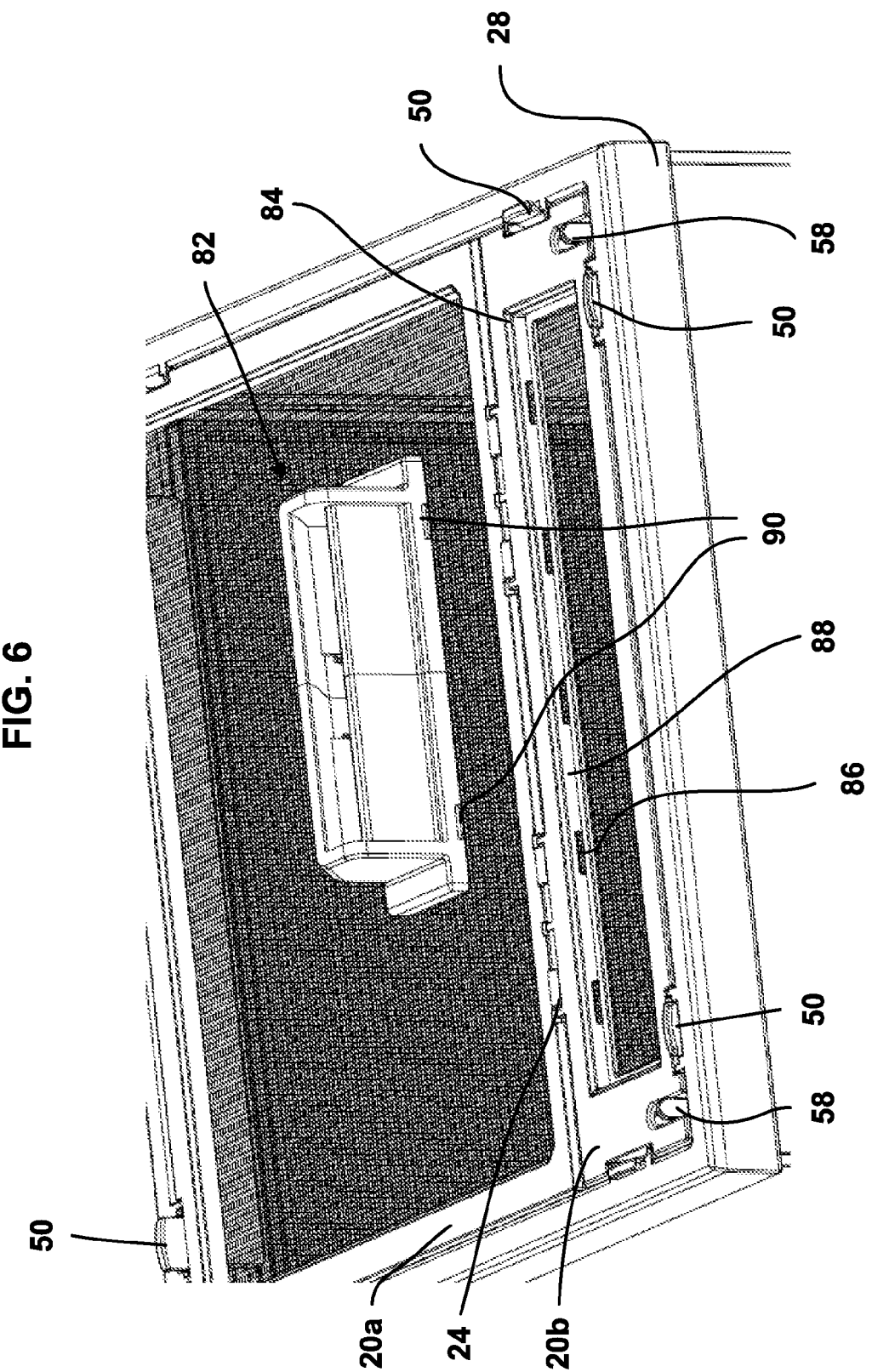
FIG. 6 is a rear side isometric view of a portion of an end-wall of the animal habitat of FIG. 1 including a mounting structure of an accessory to be mounted to the end-wall.
Figure 7:
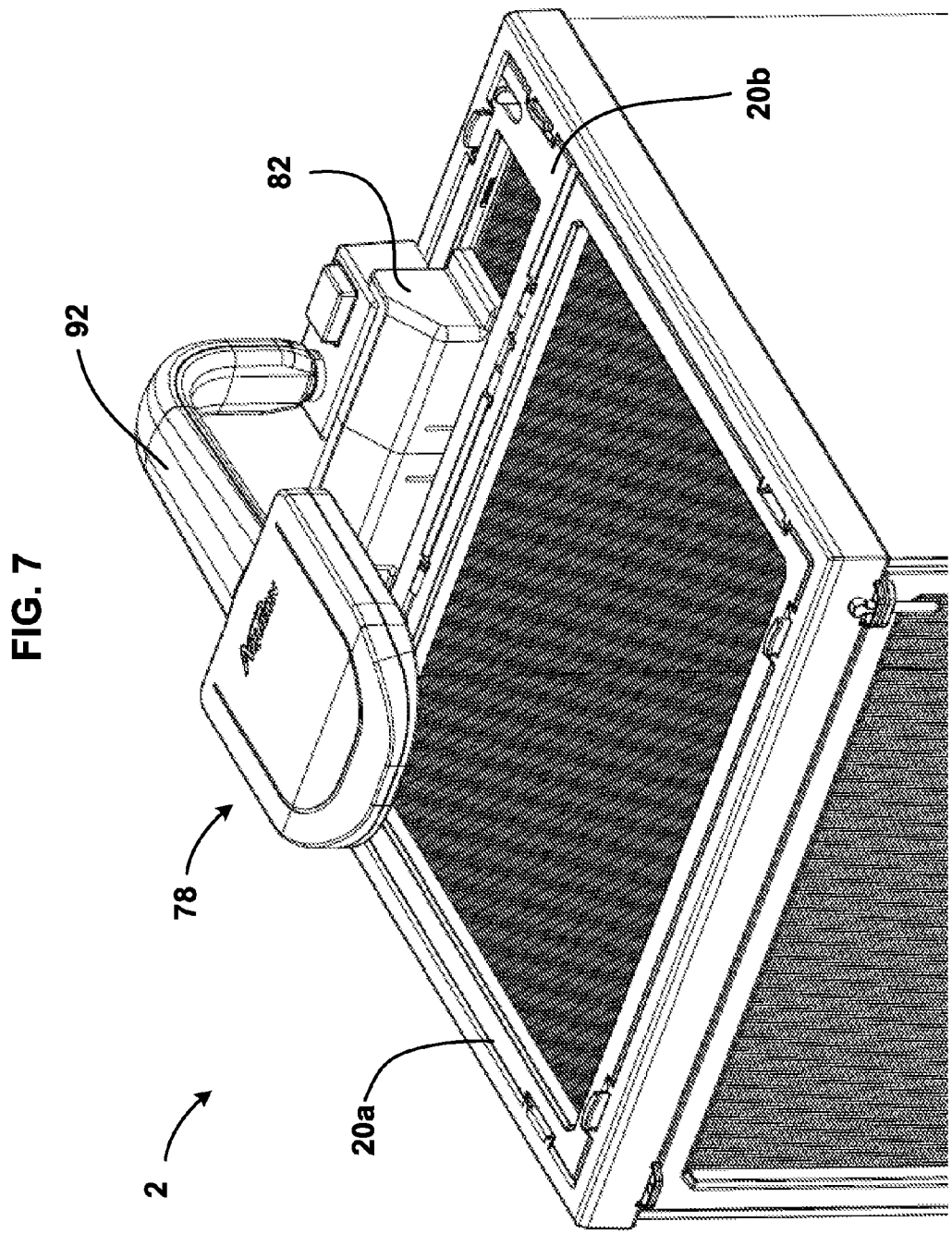
FIG. 7 is an isometric view of the end-wall of the animal habitat of FIG. 1 with an accessory mounted thereto.

As shown in FIGS. 5-7, first end-wall 20, and in particular end-wall second portion 20b, may include one or more mounting locations 80 to mount a mounting structure 82 of one or more accessories 78 (see FIG. 7) thereto. As shown, end-wall second portion 20b may include an elongated recess 84 having a plurality of engagement slots 86 arranged along the length of the sidewall 88 thereof, with the opposing slots 86 configured to receive an engagement protrusion 90 of mounting structure 82 which snap fit therein.

Figure 8:
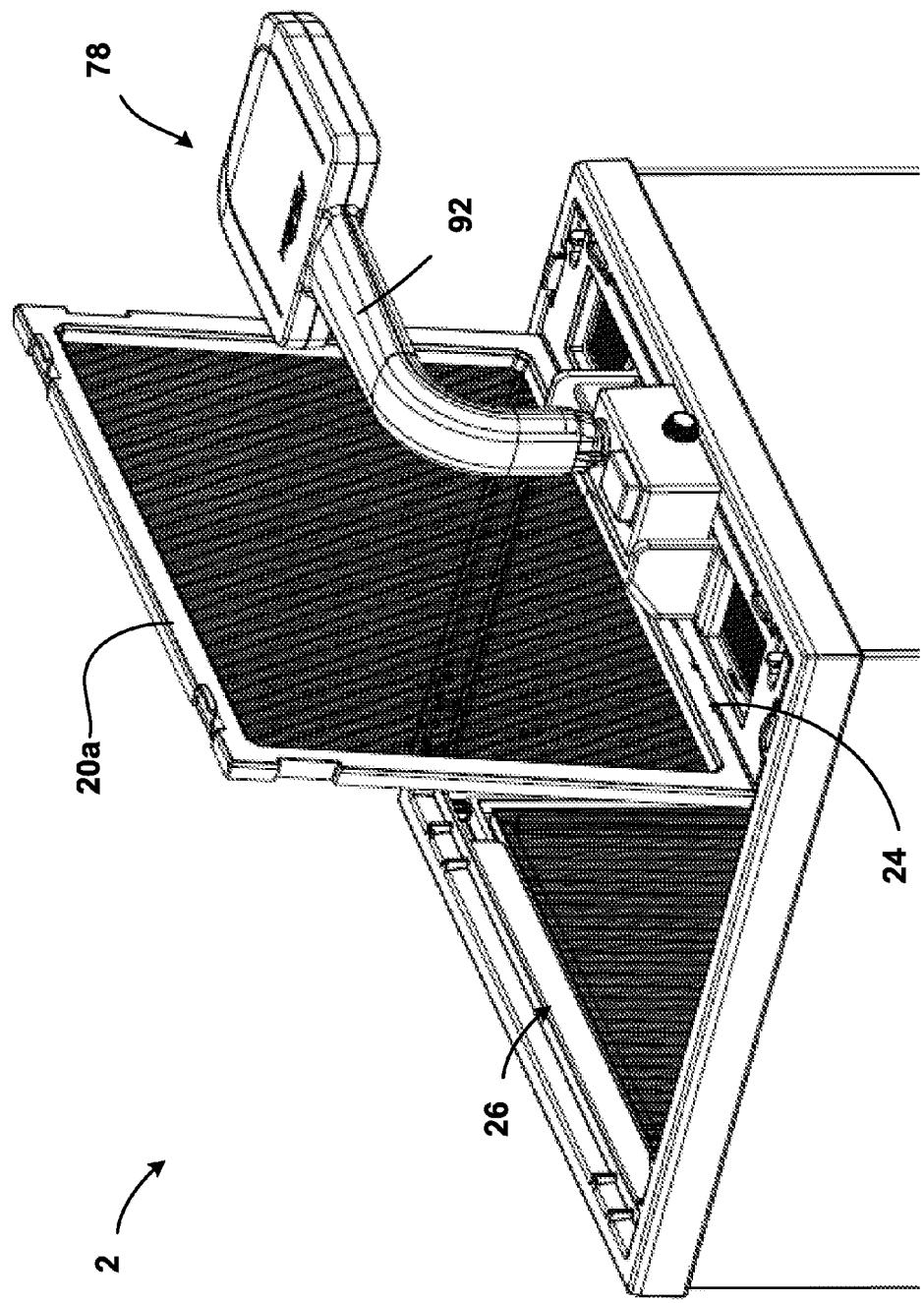
FIG. 8 is an isometric view of the end-wall of the animal habitat of FIG. 1 with an accessory mounted thereto and the end-wall door in an open position.

As shown in FIGS. 7 and 8, accessory 78 comprises a lamp such as a heating lamp and/or a UV/day lamp. As shown, the accessory 78 is rotatable about an L-shaped support arm 92 from a first position overlying end-wall first portion 20a to a second position not overlying end-wall first portion 20a such that end-wall first portion 20a may be rotated about end-wall hinge 24 to provide an end-wall access opening 26 to an interior 30 of the rectangular enclosure 10.

Figure 9:
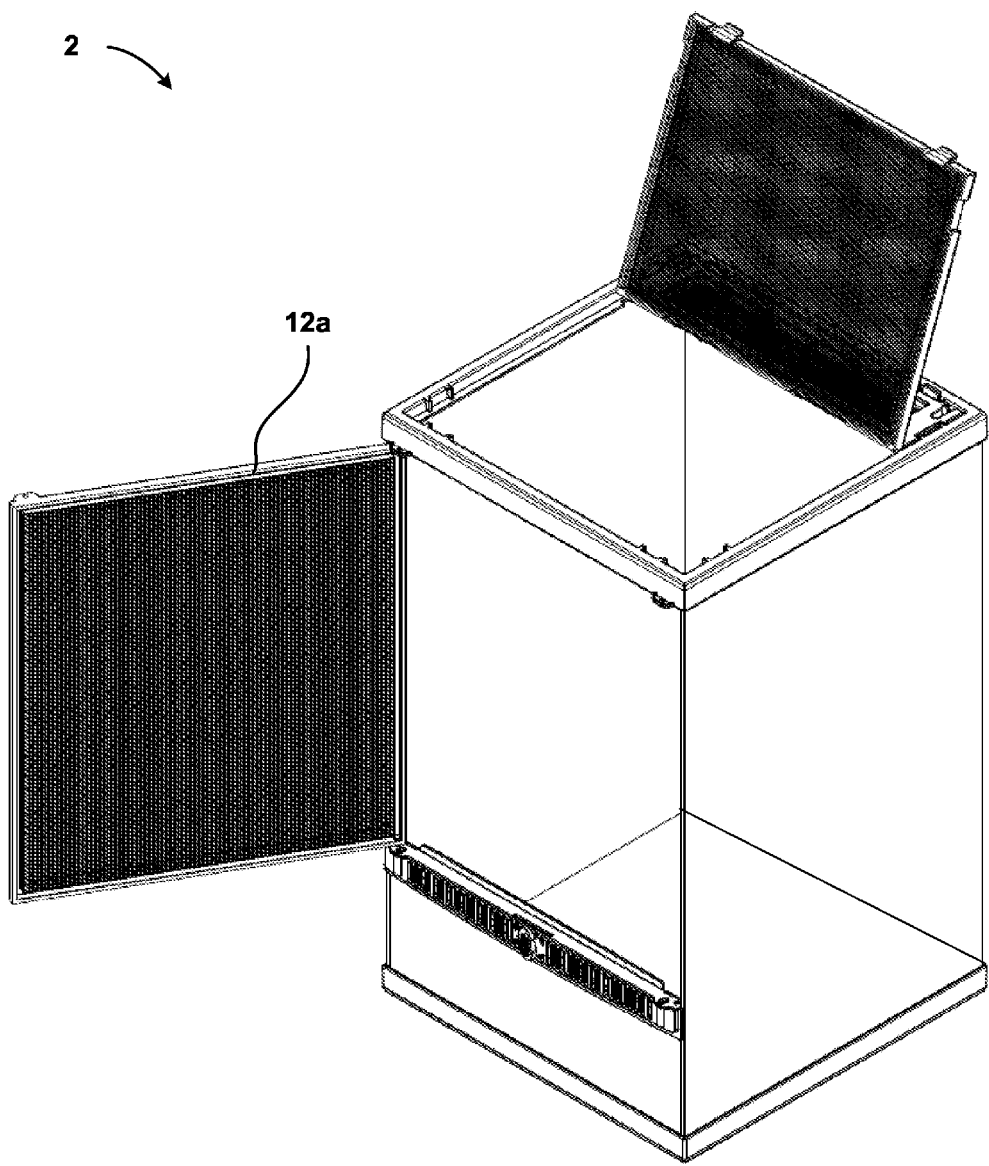
FIG. 9 is another embodiment of an animal habitat according to the present disclosure with a side-wall door formed of screen rather than glass as shown in FIG. 1.

As shown in FIG. 9, in another embodiment of the present disclosure, the side-wall first portion 12a shown in FIG. 1 as being formed of glass has been replace with screen.

Figure 10:
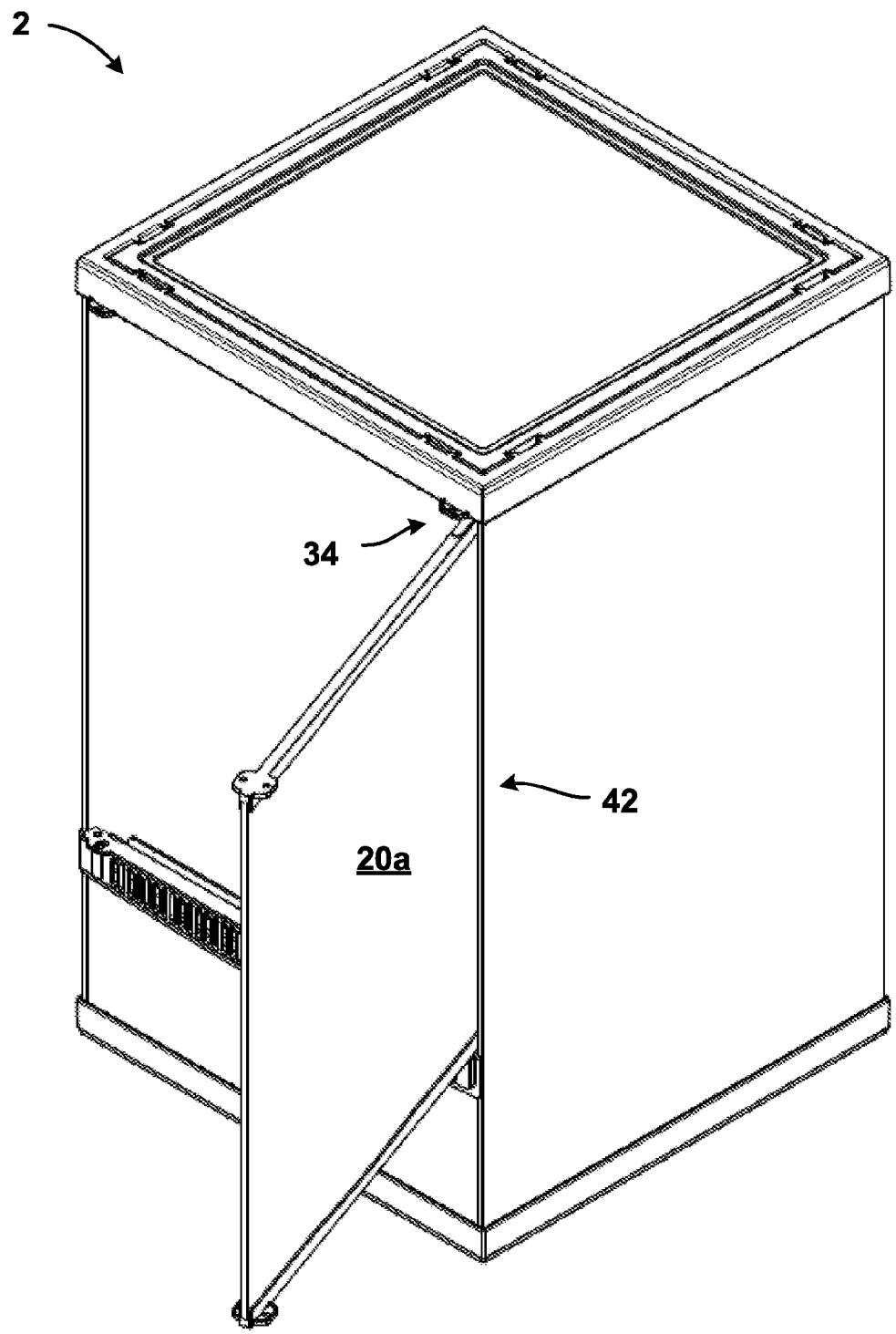
FIG. 10 is another embodiment of an animal habitat according to the present disclosure with a hinge of the side-wall door moved to an opposing side of the animal habitat.

As shown in FIG. 10, in another embodiment, side-wall hinge 34 may have a hinge position 42 in another arrangement of the animal habitat 2. Thus, as explained above, the side-wall hinge 34 has a hinge position which is changeable such that, when in a first hinge position 40, the divided side-wall first portion 12a is rotatable along a first longitudinal side-wall 14 of the enclosure 10 as shown in FIG. 1, and, when in a second hinge position 42, the divided side-wall first portion 12a is rotatable along a second longitudinal side-wall 18 of the enclosure 10 as shown in FIG. 10. As also shown in FIG. 10, in another embodiment, the first end-wall 20 shown in FIG. 1 as being formed of screen has been replaced with glass.

As shown in FIGS. 1-10, animal habitat 10 is arrangeable in a vertical orientation. However, as set forth above and as shown in FIG. 11, animal habitat 10 may also be arrangeable in a horizontal orientation.

Figure 11:
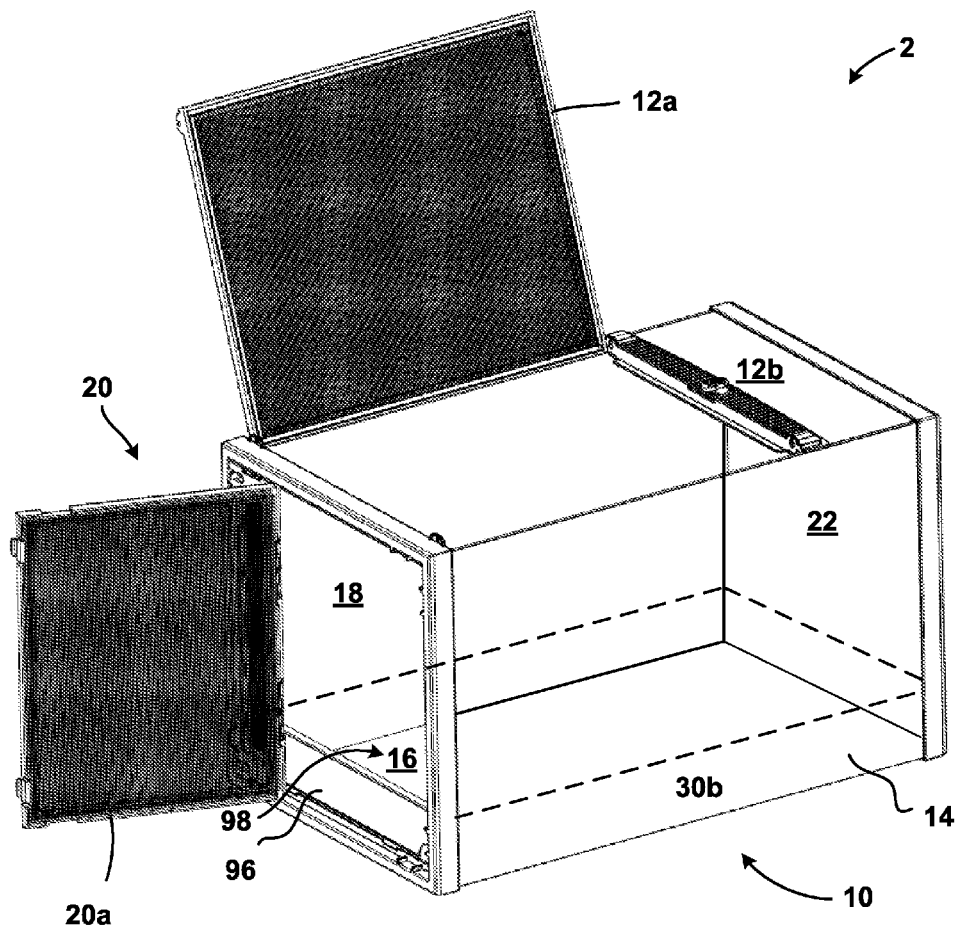
FIG. 11 is another embodiment of an animal habitat according to the present disclosure arranged in a horizontal orientation.
Figure 12:
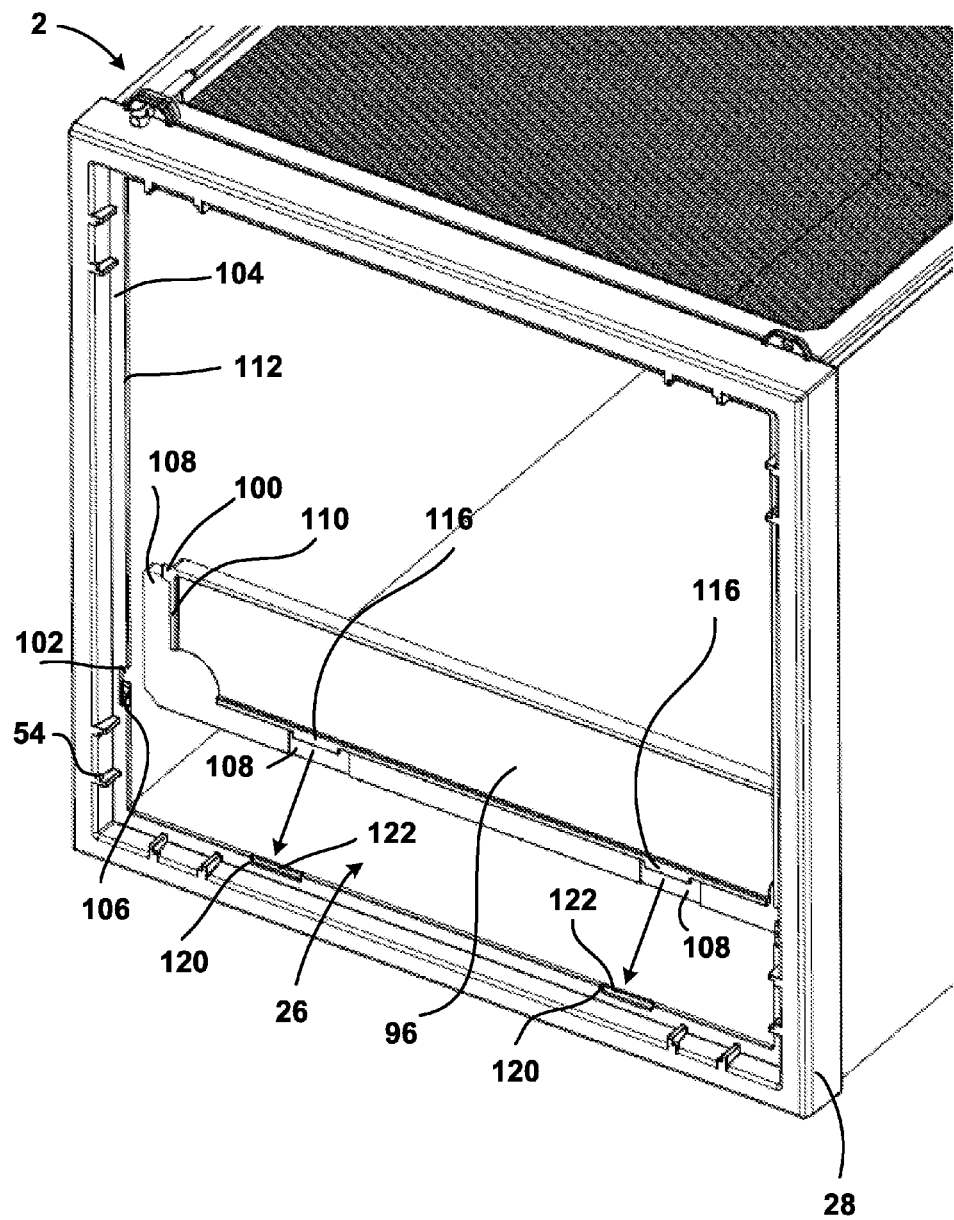
FIG. 12 is a close up isometric view of a removable end panel of the embodiment of FIG. 11 prior to installation.
Figure 13:
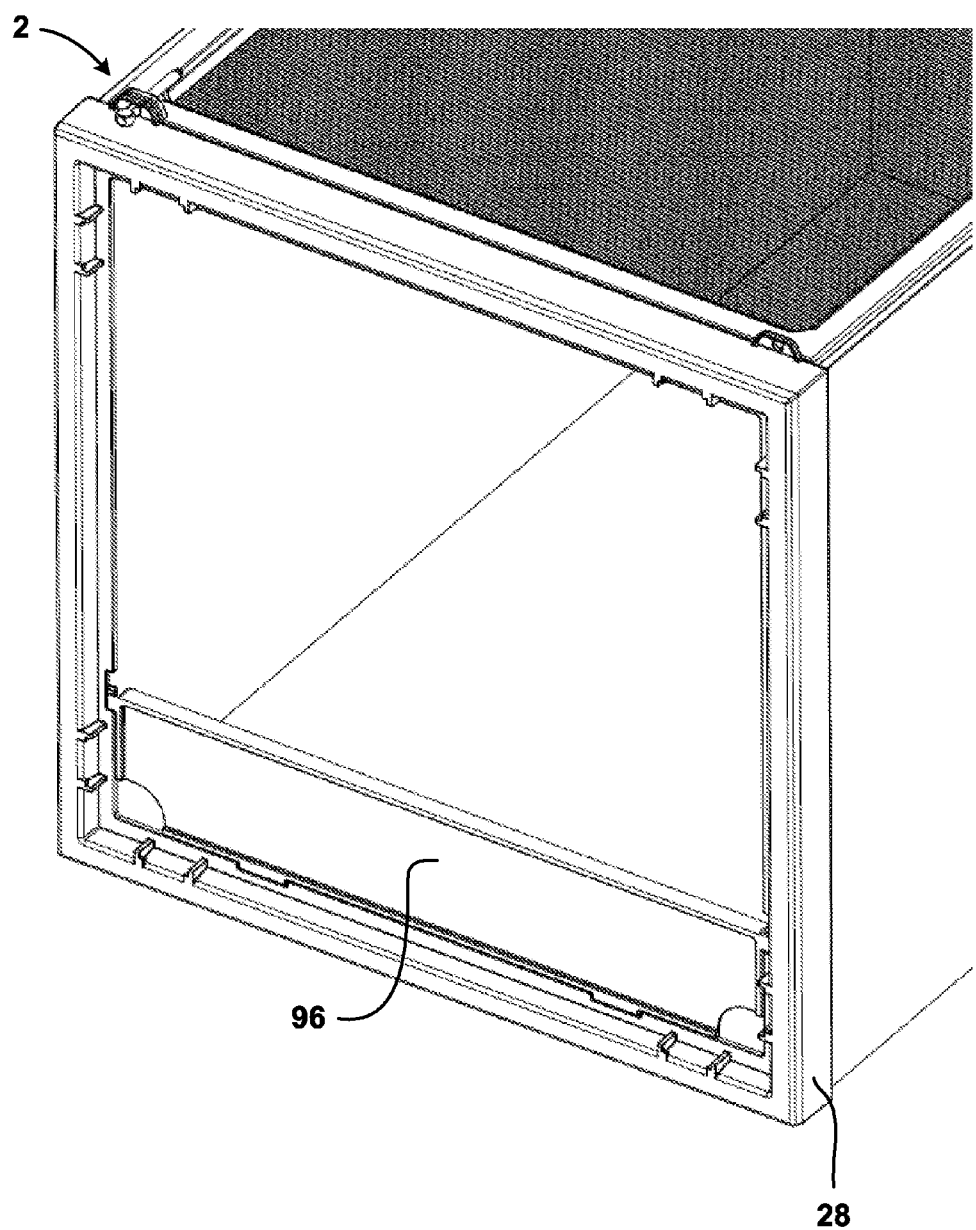
FIG. 13 is a close up isometric view of the removable end panel of the embodiment of FIG. 11 after installation.

As shown in FIGS. 11-13, particularly when used in a horizontal orientation, habitat 2 may further comprise a removable end closure panel 96 located adjacent and inside of the first end-wall 20, such that, when the enclosure 10 is in a horizontal orientation, a (lower) portion 30b of the interior 30 of rectangular enclosure 10 (beneath the dotted line surrounding enclosure 10) provides a bedding containment area 98, wherein the bedding containment area 98 is formed by side-wall 16, a portion of side-walls 14 and 18, a portion of end-wall 22 and the removable end closure panel 96.

As shown in FIG. 12, the removable end closure panel 96 is configured to slide into assembly with frame 28 by first passing an outer lip 100 of closure panel 96 through lip aperture 102 formed in flange 104 of frame 28. Once the outer lip 100 is through the lip aperture 102 the closure panel 96 is then moved parallel (downward) along flange 104 such that outer lip 100 overlies a thinned portion 106 of flange 104 and an inner lip 108 underlies flange 104.

In order to properly position the closure panel 96 in opening 26 and guide installation, the closure panel 96 may include a guide rib 110 which butts up against the face 112 of flange 104 during installation. In order to further strengthen the mechanical connection with frame 28, closure panel 96 may further include two additional outer lip portions 116 which fit into recesses 120 and capture (sandwich) a thinned portion 122 of the flange 104 between outer lip portions 116 and inner lip 108. In the foregoing manner, once the closure panel 96 is properly positioned (seated), as shown in FIG. 13, the closure panel 96 is mechanically connected to the frame against inward or outward movement, particularly with a fastening mechanism formed integral to the closure panel 96 and frame 28 which does not require separate fasteners.

Figure 14:
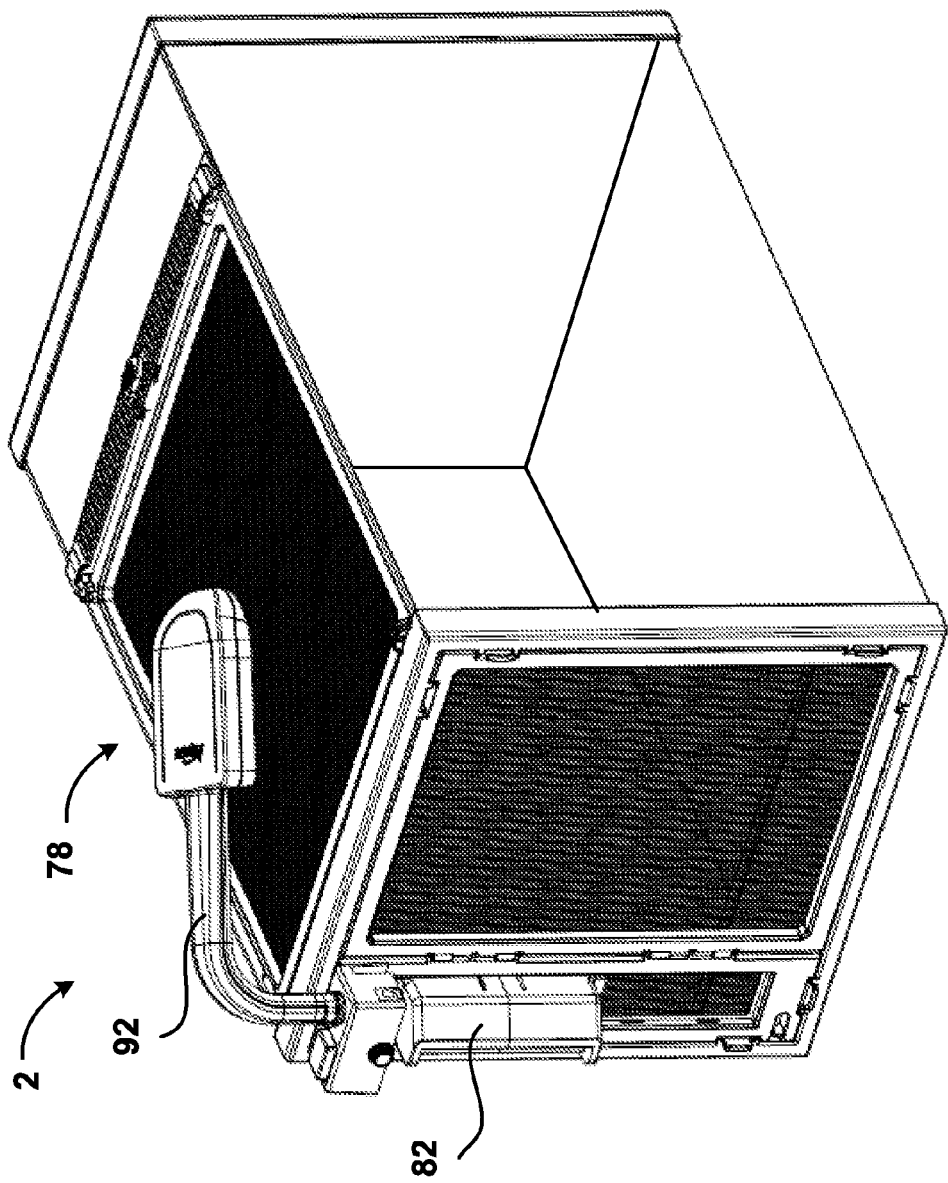
FIG. 14 is an isometric view of the animal habitat of FIG. 11 with an accessory mounted thereto.
Figure 15:
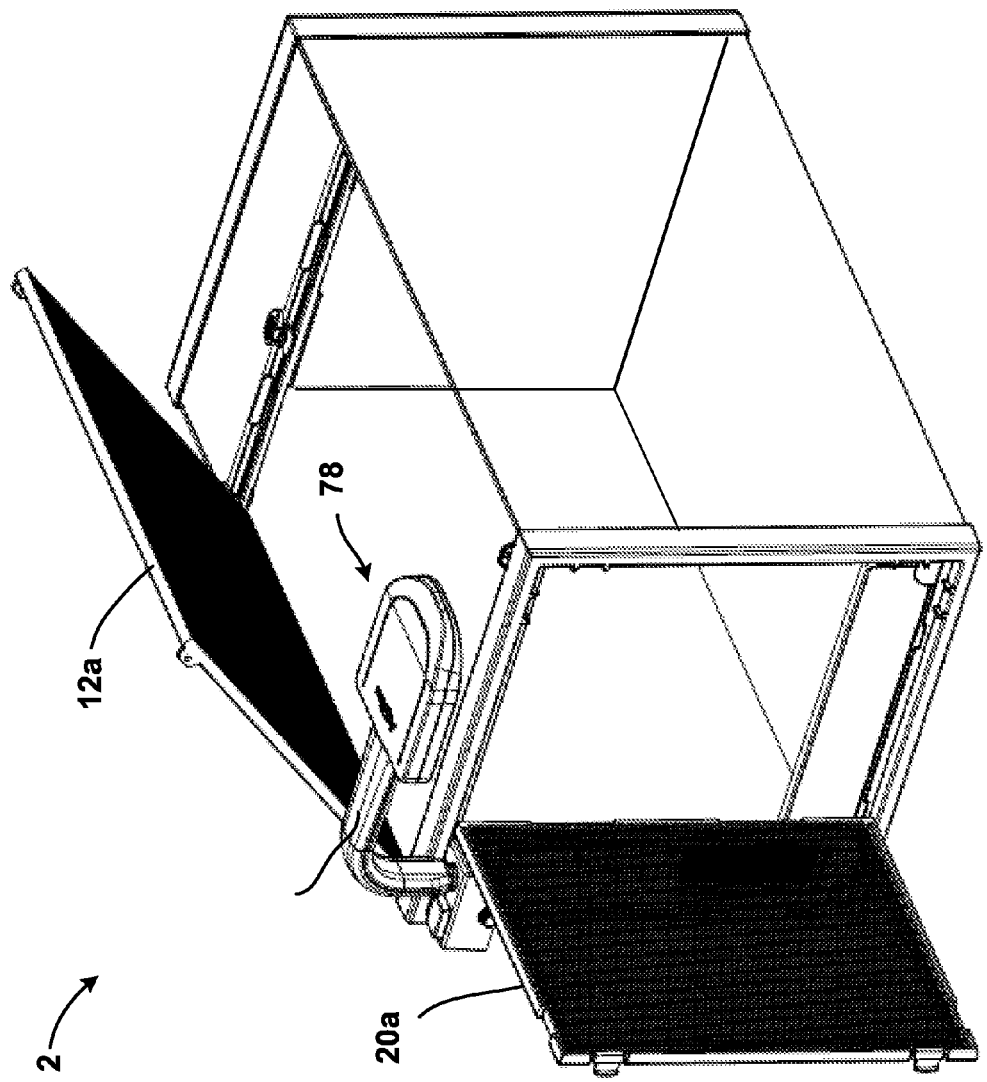
FIG. 15 is an isometric view of the end-wall of the animal habitat of FIG. 1 with an accessory mounted thereto and the end-wall and side-wall doors in an open position.

In FIG. 14, the animal habitat 2 may further include the same accessory 78 as shown in FIGS. 5-8. However, rather than being located in the middle of the mounting locations 80, the mounting structure 82 is now off-center and located at one end of elongated recess 84. As shown in FIG. 15, similar to the vertical orientation, the accessory 78 is rotatable about an L-shaped support arm 92 from a first position overlying side-wall first portion 12*a* to a second position not overlying side-wall first portion 12*a* such that side-wall first portion 12*a* may be rotated about side-wall hinge 34 to provide an end-wall access opening 36 to an interior 30 of the rectangular enclosure 10.

While a preferred embodiment of the present invention(s) has been described, it should be understood that various changes, adaptations and modifications can be made therein without departing from the spirit of the invention(s) and the scope of the appended claims. The scope of the invention(s) should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

What is claimed is:

1. An animal habitat comprising:
   a rectangular enclosure arrangeable in a vertical or a horizontal orientation, the rectangular enclosure comprising four side-walls and two opposing end-walls, wherein the two opposing end-walls comprise a first end-wall and a second-end wall;
   wherein the four side-walls are joined to a frame at a first end of the enclosure;
   wherein the first end-wall is releaseably connectable to the frame and positionable within the frame in a plurality of orientations;
   wherein the first end-wall comprises a divided end-wall, wherein the divided end-wall comprises a divided end-wall first portion and a divided end-wall second portion, wherein the divided end-wall first portion is movable about an end-wall hinge to provide an end-wall door and access to an interior of the rectangular enclosure;
   wherein at least one of the side-walls comprises a divided side-wall, wherein the divided side-wall comprises a divided side-wall first portion and a divided side-wall second portion;
   wherein the divided side-wall first portion is movable about a side-wall hinge to provide a side-wall door and access to the interior of the rectangular enclosure, wherein the side-wall hinge has a hinge position which is changeable such that, when in a first hinge position, the divided side-wall first portion is rotatable along a first longitudinal side of the enclosure and, when in a second hinge position, the divided side-wall first portion is rotatable along a second longitudinal side of the enclosure.

2. The habitat of claim 1 wherein:
   when the enclosure is in the vertical orientation, a first portion of the rectangular enclosure provides a water-tight basin at a second end of the enclosure, wherein the water-tight basin is formed by the second end-wall, the divided side-wall second portion and the three remaining side-walls.

3. The habitat of claim 1 further comprising:
   a removable closure panel located adjacent and inside of the first end-wall, such that, when the enclosure is in a horizontal orientation, a second portion of rectangular enclosure provides a bedding containment area, wherein the bedding containment area is formed by the second end wall, three of the side-walls and the removable closure panel.

4. The habitat of claim 3 wherein:
   the removable closure panel is mechanically connected to the frame.

5. The habitat of claim 3 wherein:
   the removable closure panel is mechanically connected to the frame against inward or outward movement.

6. The habitat of claim 3 wherein:
   the removable closure panel is mechanically connected to the frame with a fastening mechanism formed integral to the closure panel and frame which does not require separate fasteners.

7. The habitat of claim 3 wherein:
   the removable closure panel slides into mechanical engagement with the frame.

8. The habitat of claim 1 wherein:
   the first end-wall is releaseably connectable to the frame with a plurality of deformable plastic tabs.

9. The habitat of claim 8 wherein:
   the deformable plastic tabs are elastically deformable with a cantilevered U-shape.

10. The habitat of claim 1 wherein:
    the divided first end-wall is positionable and connectable to the frame such that the end-wall door is openable and closeable along any of the four side-walls.

11. The habitat of claim 1 wherein:
    the first end-wall further comprises at least one aperture containing a self-closing closure mechanism to close the aperture.

12. The habitat of claim 11 wherein:
    the self-closing closure mechanism is spring loaded.

13. The habitat of claim 11 wherein:
    the aperture is sized for at least one of an electrical cord and tubing.

14. The habitat of claim 1 further comprising:
    a habitat accessory mountable to the enclosure; and
    the first end wall provides a mounting structure for the habitat accessory to be removably connected to the habitat.

15. The habitat of claim 14 wherein:
    the habitat accessory comprises at least one of a heating lamp and a UV lamp.

16. The habitat of claim 14 wherein:
    the mounting structure enables the habitat accessory to be mounted to enclosure for use when the enclosure is in either the vertical or horizontal orientation.

17. The habitat of claim 14 wherein:
    the habitat accessory is movable from a first position overlying the divided end-wall first portion to a second position not overlying the divided end-wall first portion such that, when the habitat accessory is in the second position, the end-wall door is openable to provide access to the interior of the rectangular enclosure without such movement being inhibited by the habitat accessory.

18. The habitat of claim 1 wherein:
    the end-wall hinge is located between the divided end-wall first portion and the divided end-wall second portion.

19. The habitat of claim 1 further comprising:
    a locking mechanism to maintain the a divided side-wall first portion in a closed position.

20. The habitat of claim 19 wherein:
    the locking mechanism is operable with the side-wall hinge located in either the first hinge position or the second hinge position.

21. A method of using an animal habitat comprising:
providing an enclosure arrangeable in a vertical orientation providing a first animal environment within the enclosure and a horizontal orientation providing a second animal environment within the enclosure, wherein the second animal environment is different than the first animal environment.
wherein the first animal environment within the enclosure is an amphibious environment including a water basin defined by a first portion of the enclosure;
wherein the second animal environment within the enclosure is a dry environment including a dry bedding area defined by a second portion of the enclosure; and
wherein the dry bedding area is formed by placing a removable panel at an end of the enclosure including a door which inhibits loss of the bedding from the enclosure when the door is in an open position.

* * * * *